US010223102B2

(12) United States Patent
Swaminathan et al.

(10) Patent No.: US 10,223,102 B2
(45) Date of Patent: Mar. 5, 2019

(54) OPTIMIZATION OF A MEDIA PROCESSING SYSTEM BASED ON LATENCY PERFORMANCE

(71) Applicant: Adobe Systems Incorporated, San Jose, CA (US)

(72) Inventors: Viswanathan Swaminathan, Saratoga, CA (US); Saayan Mitra, San Jose, CA (US); Haoliang Wang, Fairfax, VA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/658,327

(22) Filed: Jul. 24, 2017

(65) Prior Publication Data

US 2019/0026105 A1    Jan. 24, 2019

(51) Int. Cl.
*G06F 8/658* (2018.01)
*G06F 9/455* (2018.01)
(Continued)

(52) U.S. Cl.
CPC .......... *G06F 8/658* (2018.02); *G06F 9/45558* (2013.01); *G06F 11/302* (2013.01);
(Continued)

(58) Field of Classification Search
CPC .... G06F 8/658; G06F 9/45558; G06F 11/302; G06F 11/3409; G06F 2009/4557; G06N 5/04
(Continued)

(56) References Cited

U.S. PATENT DOCUMENTS 7,162,419 B2 * 1/2007 Ojanpera ................ G10L 19/04
   704/219
7,924,843 B2 * 4/2011 Matias .............. H04L 29/06027
   341/67

(Continued)

OTHER PUBLICATIONS

Nan, "Optimal Resource Allocation for Multimedia Application Providers in Multi-site Cloud", 2013, IEEE (Year: 2013).*

(Continued)

*Primary Examiner* — Hossain M Morshed
(74) *Attorney, Agent, or Firm* — Kilpatrick Townsend & Stockton LLP

(57) ABSTRACT

Various embodiments describe a dynamic reconfiguration of a media processing system to optimize a latency performance. In an example, a computer system accesses a current latency performance of the media processing system. The latency is associated with performing a codec process on a current configuration of the media processing system. The current configuration includes virtual machines. The computer system estimates, based on the current latency performance and on historical latency performances associated with the current configuration, a next latency performance of the media processing system. The computer system also identifies, from potential configurations, an updated configuration of the media processing system based on a difference between the next latency performance and a target latency performance and on historical performances associated with the potential configurations. The updated configuration specifies an additional number of virtual machines associated with hosting the codec process. The computer system launches the additional number of virtual machines.

18 Claims, 8 Drawing Sheets

(51) Int. Cl.
*G06F 11/34* (2006.01)
*G06F 11/30* (2006.01)
*G06N 5/04* (2006.01)

(52) U.S. Cl.
CPC .......... *G06F 11/3409* (2013.01); *G06N 5/04* (2013.01); *G06F 2009/4557* (2013.01)

(58) Field of Classification Search
USPC ........................................................ 717/168
See application file for complete search history.

(56) References Cited

U.S. PATENT DOCUMENTS

| | | | | |
|---|---|---|---|---|
| 10,027,739 B1* | 7/2018 | Krishnan | ................ | H04L 67/10 |
| 2009/0073974 A1* | 3/2009 | Musoll | ................... | H04L 45/00 |
| | | | | 370/389 |
| 2013/0080641 A1* | 3/2013 | Lui | ........................ | H04L 67/10 |
| | | | | 709/226 |
| 2015/0172354 A1* | 6/2015 | Coppola | ................ | H04L 65/80 |
| | | | | 709/203 |
| 2016/0104377 A1* | 4/2016 | French | .................. | H04H 20/55 |
| | | | | 701/117 |
| 2016/0173571 A1* | 6/2016 | Bragstad | ................ | H04L 47/78 |
| | | | | 709/226 |

OTHER PUBLICATIONS

Chi, "Proactive resource provisioning", 2004, Computer Communications 27 (2004) 1174-1182 (Year: 2004).*

U.S. Appl. No. 15/658,282, U.S. Patent Application, filed Jul. 24, 2017, Titled: Low Latency Vector Quantization for Data Compression.

Arya, Sunil and David M. Mount, "Algorithms for Fast Vector Quantization," *Proc. Data Compression Conference*, J. A. Storer and M. Cohn, eds., Snowbird, Utah (1993), IEEE Computer Society Press, pp. 381-390.

Linde et al, "An Algorithm for Vector Quantizer Design," *IEEE Transactions on Communications*, 28 (1980), pp. 84-95.

Pan et al., "Fast clustering algorithms for vector quantization," *Pattern Recognition*, vol. 29, Issue 3 (Mar. 1996), pp. 511-518.

Somervuo, Panu and Teuvo Kohonen, "Self-Organizing Maps and Learning Vector Quantization for Feature Sequences," *Neural Processing Letters*, vol. 10, Issue 2 (Oct. 1999), pp. 151-159.

Song, Byung Cheol and Jong Beom Ra, "A Fast Search Algorithm for Vector Quantization using L/sub 2/-norm Pyramid of Codewords," *IEEE Transactions on Image Processing*, vol. 11, Issue: 1 (Jan. 2002), pp. 10-15.

* cited by examiner

OPTIMIZATION OF A MEDIA PROCESSING SYSTEM BASED ON LATENCY PERFORMANCE

TECHNICAL FIELD

The application generally relates to the optimization of a media processing system that implements a codec for processing data. In an example, the configuration of the media processing system is updated based on a latency performance associated with the codec. The update includes deploying, freeing, or terminating computing resources, such as virtual machines, of the media processing system, where the computing resources host the codec.

BACKGROUND

An electronic media platform provides access to media data (e.g., electronic content). A user operates a computing device to remotely connect to the electronic media platform and request particular media data (e.g., a media file). The requested media data is sent to the computing device for presentation to the user.

The media data can include audio data, video data, and/or other multimedia data. In many situations, storing the media data in its original format uses a relatively large storage space, and transmitting the media data in its original format uses a relatively large network bandwidth. To reduce these storage space and network bandwidth requirements, the electronic media platform implements data compression, such as a codec that uses vector quantization.

Data compression techniques often cause latency when accessing the media data. One reason for the latency is because the data compression involves computationally complex operations to transform the media data from the original format to the compressed format. Furthermore, an increase in the user demand and/or a decrease in the availability of the computing resources worsens the latency.

To reduce latency, many existing electronic media platforms adjust the available computing resources by, for example, adding or removing resources. Such existing platforms operate in a reactive mode or in a proactive mode. In the reactive mode, an electronic media platform adjusts the computing resources, but only after a latency degradation is observed. However, in this mode, the performance of the electronic media platform is not improved until the adjustment is completed. In the proactive mode, an electronic media platform typically predicts the user demand and adjusts the computing resources beforehand. However in this mode, the performance enhancement does not account for unforeseen fluctuations in the user demand or the availability of the computing resources. Hence, the performance may still not be the optimal performance. For example, if the actual demand is greater than the predicted use demand, the computing resources are over-committed because the adjustment fails to deploy enough computing resources. Conversely, if the actual demand is relatively smaller, the computing resources are under-committed because the adjustment deploys unnecessary computing resources. Further, if there is a resource failure (e.g., a set of computing resources goes offline), the electronic media platform has to revert back to the reactive mode.

SUMMARY

Embodiments of the present disclosure are directed to a dynamic and proactive reconfiguration of a resources, such as virtual machines, that host a codec process to reduce latency when performing the codec process. In an example, a computer system manages the resources available by using latency-related factors to optimize, at predefined time intervals, the number of resources. For example, the computer system accesses a current latency performance processing media vectors on a current configuration of the resources. The current configuration includes a number of virtual machines. The computer system estimates, based on the current latency performance and on historical latency performances associated with the current configuration, a next latency performance. The computer system also identifies an updated configuration of the resources from potential configurations. The updated configuration is identified based on a difference between the next latency performance and a target latency performance and on historical performances associated with the potential configurations. The updated configuration specifies an additional number of virtual machines associated with hosting the codec process. The computer system launches the additional number of virtual machines.

These illustrative examples are mentioned not to limit or define the disclosure, but to provide examples to aid understanding thereof. Additional embodiments and examples are discussed in the Detailed Description, and further description is provided there.

DETAILED DESCRIPTION

Figure 1:
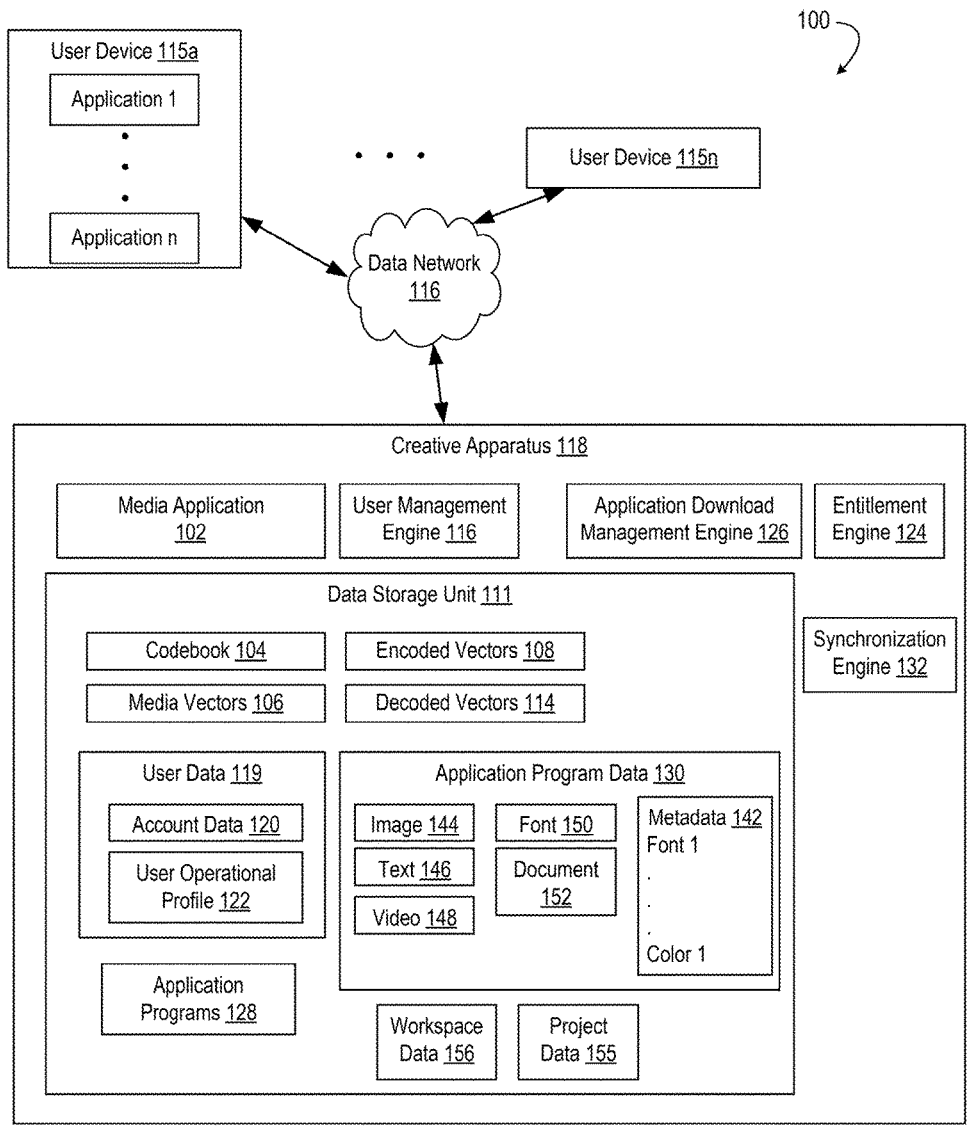
FIG. 1 is a diagram depicting an example of a network environment for implementing a codec process according to certain embodiments.

Embodiments of the present disclosure are directed to, among other things, optimizing the latency performance of an electronic media platform. Unlike the existing systems that typically quantify the user demand to adjust computing resources, the embodiments involve using the latency performance for the adjustment. In an example, the current latency performance is monitored and used to predict the next latency performance in a next time period given the current configuration of the electronic media platform. If the prediction indicates an unacceptable performance in the next time period, various possible next configurations are analyzed to predict whether any of such configurations would further improve the next latency performance. The best possible next configuration is selected and the configuration of the electronic platform is adjusted from the current configuration to the next configuration. This type of monitoring and adjustment is repeated over time to ensure that the best configuration is continuously deployed for the electronic media platform. Hence, by using the latency performance as a primary optimization factor, the best configuration can be deployed at all times, thereby achieving the best possible latency performance. In contrast, existing systems can improve the latency performance, but the improvements are not as significant because the primary optimization factor is limited to the user demand.

In an illustrative embodiment, an electronic media platform is hosted on a computing cloud (e.g., one implemented on computing resources of a data center) and provides digital video recording (DVR) functionalities. Virtual machines are deployed to host a vector quantization-based codec. This codec uses a codebook to compress and decompress media data (e.g., video data of television shows). One set of virtual machines hosts a trainer that generates the codebook based on media data available from a stream over multiple media channels (e.g., a stream over multiple cable channels). Another set of virtual machines hosts an encoder that generates compressed data from the media data based on the codebook. Yet another set of virtual machines hosts a decoder that decompresses the compressed data based on the codebook.

In this example, the user demand for the media data impacts the operations of the encoder and decoder, but not the operations of the trainer. Specifically, the codebook is generated based on the media data stream regardless of the actual user demand for particular media data (e.g., the user demand for particular television shows). In this way, the codebook is usable for the compression and decompression of any media data. In comparison, each user operates a computing device to access the electronic media platform and requests the recording of a particular media data (e.g., video data for a particular television show). The encoder is invoked to compress and store the particular media data for each user. Upon a request to play the particular media data from a user, the decoder is invoked to decompress the relevant compressed data. Hence, the number and timing of record requests and play requests fluctuate over time. Accordingly, the operational workload of the encoder and decoder also fluctuate over time.

Continuing with this example, the overall latency performance of the electronic platform depends on a number of factors. These factors include the individual latencies of the trainer, encoder, and decoder. Other factors include the fluctuation in the number and timing of the record requests and play requests. Yet other factors relate to the computing cloud environment, such as the hardware failure (e.g., of the underlying computing resources of the data center), performance degradation because of the shared cloud environment, network changes, and other environment-related factors.

To reduce latency, the electronic media platform considers one or more of these different factors to achieve the best possible latency performance. For example, the electronic media platform implements autonomic computing to dynamically self-manage (e.g., without input of an operator of the electronic media platform) the distributed computing resources (e.g., the different sets of virtual machines). Under this implementation, measurements about the various factors are collected at predefined time intervals (e.g., continuously when the time intervals are negligible or periodically at discrete time intervals). The measurements from past time intervals and from a current time interval are used to heuristically estimate the current latency performance of the electronic media platform. This current latency performance and the current configuration of the electronic media platform (e.g., the number and groupings of virtual machines) are input to a state machine. The output from the state machine is a prediction of the next latency performance in the next time interval (e.g., what that latency performance is and its likelihood). The next latency performance is compared to a target latency performance.

If a difference exists, a search is performed to identify, from different possible configurations, the next configuration that would minimize the difference. This search can also use a state machine and account for the latency to deploy new virtual machines or other computing resources. The next configuration identifies additional virtual machines that should be launched, or existing virtual machines that should be terminated, and the codec sub-process (e.g., trainer, encoder, decoder) on each virtual machine. The computing cloud is adjusted accordingly by changing the number of virtual machines in the next time interval. This control process for collecting measurements, updating the configuration, and managing the virtual machines is repeated across the various time intervals.

As described above, existing systems typically consider the user demand to improve the latency performance. Hence, any achieved improvement by these systems does not consider other contributing factors to the latency performance, such as the individual latencies of the trainer, encoder, and decoder or the computing cloud environment-related factors. Accordingly, the latency improvement of existing systems is sub-optimal.

In the interest of clarity of explanation, various embodiments of the present disclosure are described in connection with an electronic media platform that compresses and decompresses media data available from a media stream. However, the embodiments are not limited as such. The embodiments also apply to the compression and decompression of any type of data on any type of electronic platform. Further, and in the interest of clarity of explanation, the embodiments are described in connection with a latency-based optimization. Nonetheless, the embodiments are not limited as such. The embodiments similarly apply to an optimization based on other types of performances, such as central processing unit (CPU) usage, memory usage, power consumption, etc. Generally, the embodiments involve autonomic computing to dynamically self-manage distributed computing resources of an electronic platform, where this management relies on performance-related measurements to dynamically adjust the computing resources and optimize the performance. The performance can include any or a combination of latency, CPU usage, memory usage, power consumption and can be defined in, for example, a service level agreement (SLA) of the electronic platform.

FIG. 1 is a diagram depicting an example of a network environment 100 for implementing a codec process according to certain embodiments. The network environment 100 supports (e.g., hosts) an electronic media platform. In the example depicted in FIG. 1, a media application 102 of the electronic media platform uses a codec process such as one that involves vector quantization. For instance, the media application 102 implements a trainer configured to generate a codebook 104 based on media vectors 106, an encoder configured to generate encoded vectors 108 by encoding the media vectors 106 based on the codebook 108, and a decoder configured to generate decoded vectors 114 by decoding the encoded media vectors 108. Examples of operations of the codec process are described in connection with the next figures. In some embodiments, the media application 102 is executed by a creative apparatus 118 using data stored on a data storage unit 111 (e.g., one or more of the codebook 104, the media vectors 106, the encoded vectors 108, and the decoded vectors 114). In additional or alternative embodiments, the media application 102 is executed by another device, such as a user device 115*a*, using data stored on the data storage unit 111 (e.g., or data stored on a non-transitory computer-readable medium storing one or more of the codebook 104, the media vectors 106, the encoded vectors 108, and the decoded vectors 114).

In some embodiments, the environment 100 includes user devices, such as user devices 115*a*-*n*. Each of the user devices is connected to either the creative apparatus 118 or a marketing apparatus, or both, via a network 116. A user of the user devices uses various products, applications, or services supported by the creative apparatus 118 via the network 116.

The user devices 115*a*-*n* correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming, or performing any other function or workflow related to content. Digital tools include the creative apparatus 118. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer, tablet computer, a desktop computer, a processing unit, any combination of these devices, or any other suitable device having one or more processors. Each user device includes at least one application supported by the creative apparatus 118. It is to be appreciated that the following description is now explained using the user device 115*a* as an example and any other user device can be used. Examples of the network 116 include, but are not limited to, internet, local area network ("LAN"), wireless area network, wired area network, wide area network, and the like.

The creative apparatus 118 includes one or more engines for providing one or more digital experiences to the user. In some embodiments, these engines include one or more of the engines depicted in FIG. 1. In other embodiments, one or more of the engines depicted in FIG. 1 may be omitted from a creative apparatus 118.

The creative apparatus 118 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 118 also includes a data storage unit 111. The data storage unit 111 can be implemented as one or more databases or one or more data servers. The data storage unit 111 includes data that is used by the engines of the creative apparatus 118.

In some embodiments, a user of the user device 115*a* visits a webpage or an application store to explore applications supported by the creative apparatus 118 (e.g., the media application 102). The creative apparatus 118 provides the applications (e.g., the media application 102) as a software as a service ("SaaS"), or as a standalone application that can be installed on the user device 115*a*, or as a combination.

In some embodiments, the user creates an account with the creative apparatus 118 by providing user details and by creating login details. Alternatively, the creative apparatus 118 can automatically create login details for the user in response to receipt of the user details. In some aspects, the user is also prompted to install an application manager. The application manager enables the user to manage installation of various applications supported by the creative apparatus 118 and to manage other functionalities, such as updates, a subscription account and the like, associated with the applications. The user details are received by a user management engine 116 and stored as user data 119 in the data storage unit 111. In some aspects, the user data 119 further includes account data 120 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 122 is generated by an entitlement engine 124. The user operational profile 122 is stored in the data storage unit 111 and indicates entitlement of the user to various products or services. In some embodiments, the user operational profile 122 also indicates type of user, i.e. free, trial, student, discounted, or paid. In some embodiments, the user management engine 116 and the entitlement engine 124 can be one single engine performing the functionalities of both the engines.

In some embodiments, the user installs various applications supported by the creative apparatus 118 via an application download management engine 126. Application installers or application programs 128, which may include a copy of the media application 102 or other software usable with the image to perform operations described herein, are present in the data storage unit 111 and are fetched by the application download management engine 126. These applications are made available to the user directly or via the application manager. In some embodiments, all application programs 128 are fetched and provided to the user via an interface of the application manager. In other embodiments, application programs 128 for which the user is eligible based on user's operational profile are displayed to the user. The user selects the application programs 128 or the applications that the user wants to download. The application programs 128 are downloaded on the user device 115a by the application manager via the application download management engine 126. Corresponding data regarding the download is also updated in the user operational profile 122. An application program 128 is an example of a digital tool. The application download management engine 126 also manages a process of providing updates to the user device 115a.

In some embodiments, upon download, installation, and launching of an application program, the user is asked to provide the login details. A check is again made by the user management engine 116 and the entitlement engine 124 to ensure that the user is entitled to use the application program. In other embodiments, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 111 by a synchronization engine 132. The application program data 130 can be specific to the user or can be shared with other users based on rights management.

In some embodiments, the application program data 130 includes one or more assets. The assets can be a shared asset which the user wants to share with other users or which the user wants to offer on a marketplace. The assets can also be shared across multiple application programs 128. In some embodiments, each asset includes metadata 142. Examples of the metadata 142 include, but are not limited to, font, color, size, shape, coordinate, a combination of any of these, and the like.

In some embodiments, each asset also includes a file. Examples of the file include, but are not limited to, an image 144, text 146, a video 148, a font 150, a document 152, a combination of any of these, and the like. In another aspect, an asset only includes the metadata 142. The application program data 130 also includes project data 155 and workspace data 156. In some embodiments, the project data 155 includes the assets. In additional or alternative embodiments, the assets are standalone assets. Similarly, the workspace data 156 can be part of the project data 155 in some embodiments and may be standalone data in other embodiments.

In some embodiments, the user can have one or more user devices. The application program data 130 is accessible by the user from any device, including a device that was not used to create the assets. This is achieved by the synchronization engine 132 that stores the application program data 130 in the data storage unit 111 and makes the application program data 130 available for access by the user or other users via any device. Before accessing the application program data 130 by the user from any other device or by any other user, the user or the other user may need to provide login details for authentication if not already logged in. Else, if the user or the other user is logged in then a newly created asset or updates to the application program data 130 are provided in real time. The workspace data 156 enables the synchronization engine 132 to provide same workspace configuration to the user on any other device or to the other user based on rights management data.

Figure 2:
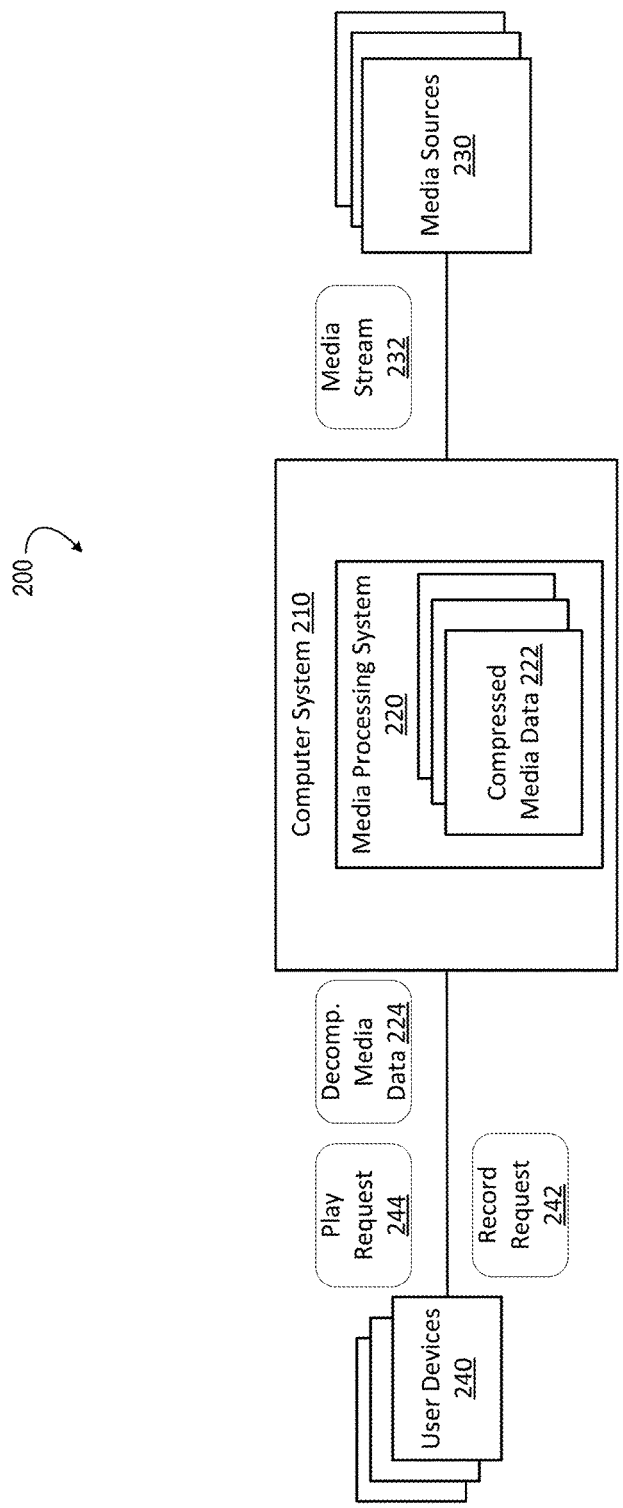
FIG. 2 is a diagram depicting an example of a system for compressing and decompressing media data according to certain embodiments.

FIG. 2 is a diagram depicting an example of a system 200 for compressing and decompressing media data according to certain embodiments. As illustrated, the system 200 includes a computer system 210 that hosts a media processing system 220. The computer system 210 can host some or all components of the creative apparatus 108 of FIG. 1 and represents an electronic media platform. The media processing system 220 applies a codec to media data available from different media sources 230 and provides access of user devices 240 to the media data. For example, the media processing system 220 hosts the media application 102 of FIG. 1.

In some embodiments, the computer system 210 includes computing resources suitable to host the media processing system 220. For example, the computing resources are virtual machines hosted in a data center and can be set up as a computing cloud.

Similarly, the media processing system 220 includes computing resources, such as virtual machines, suitable to implement the codec process. For example, the media processing system 220 hosts a trainer, an encoder, and a decoder. Such configuration is further illustrated in FIG. 3.

In some embodiments, the media sources 230 include computing resources suitable for hosting and providing media data. Some or all these computing resources can be hosted by the computer system 210. If remote from the computer system 210, the media data is provided thereto over a data network. The media data includes audio data, video data, and/or other multimedia data. The media data can have a digital format and can be streamed from the media sources 230 and/or provided on demand. The provided media data, whether streamed or on-demand, can be already compressed. For instance, the media data is compliant with a moving picture experts group (MPEG) standard, such as MPEG-4.

In some embodiments, user devices 240 include computing devices suitable for accessing media data from the computer system 210. For example, the computing devices include mobile devices, tablets, laptops, desktops, personal computers, servers, set-top boxes, or other computing devices that have data connectivity and host one or more applications for requesting and receiving media data from the computer system 210 and presenting the received media data to end users.

In an illustrative example, the system 200 supports digital video recording (DVR) functionalities in an environment of a computing cloud. In this example, the media sources 230 include online servers, content data networks (CDNs), and/or broadcast stations that provide a media stream 232 over various types of data networks. Each of the media sources 230 represents a media channel. The media processing system 220 is implemented as a set of computing resources on the computing cloud.

The computer system 210 continuously receives the media stream 232 across the different media channels. Some or all of the received media data in the media stream 232 may already be in a vector format. In another example, media vectors are generated from the received media stream 232. For instance, media data streamed in an MPEG-4 format, such as MPEG-4 formatted compressed video, the media processing system 220 generates the relevant media vectors based on sampling of the media data. Based on the media vectors, the media processing system 220 uses the trainer to continuously update a codebook for the media received across the media channel to support the codec process.

The computer system 210 receives a record request 242 from one of the user devices 240. The requesting device is associated with a user account. The record request 242 requests the recording of particular media data from one of the media channels for future playback. In turn, the media processing system 220 accesses media vectors that correspond to the requested media data and invokes the encoder to generate and store compressed media data 222 by encoding the media vectors according to the codebook. The compressed media data 222 includes indices from the codebook, where the indices are stored in lieu of the media vectors in data storage on the computing cloud for the user account.

Subsequently, the computer system 210 receives play request 244 from the user device associated with the user account. In an example, the media processing system 220 invokes the decoder to generate decompressed media data 224 by decoding the compressed media data 222 based on the codebook. The decompressed media data 224 is sent to the user device for presentation at a user interface on the user device. In another example, rather than invoking the decoder, the compressed media data 222 itself (e.g., the recorded indices) and the relevant portion of the codebook are sent to the user device. In turn, the user device invokes a decoder and decodes the compressed media data 222 based on the received codebook.

Figure 3:
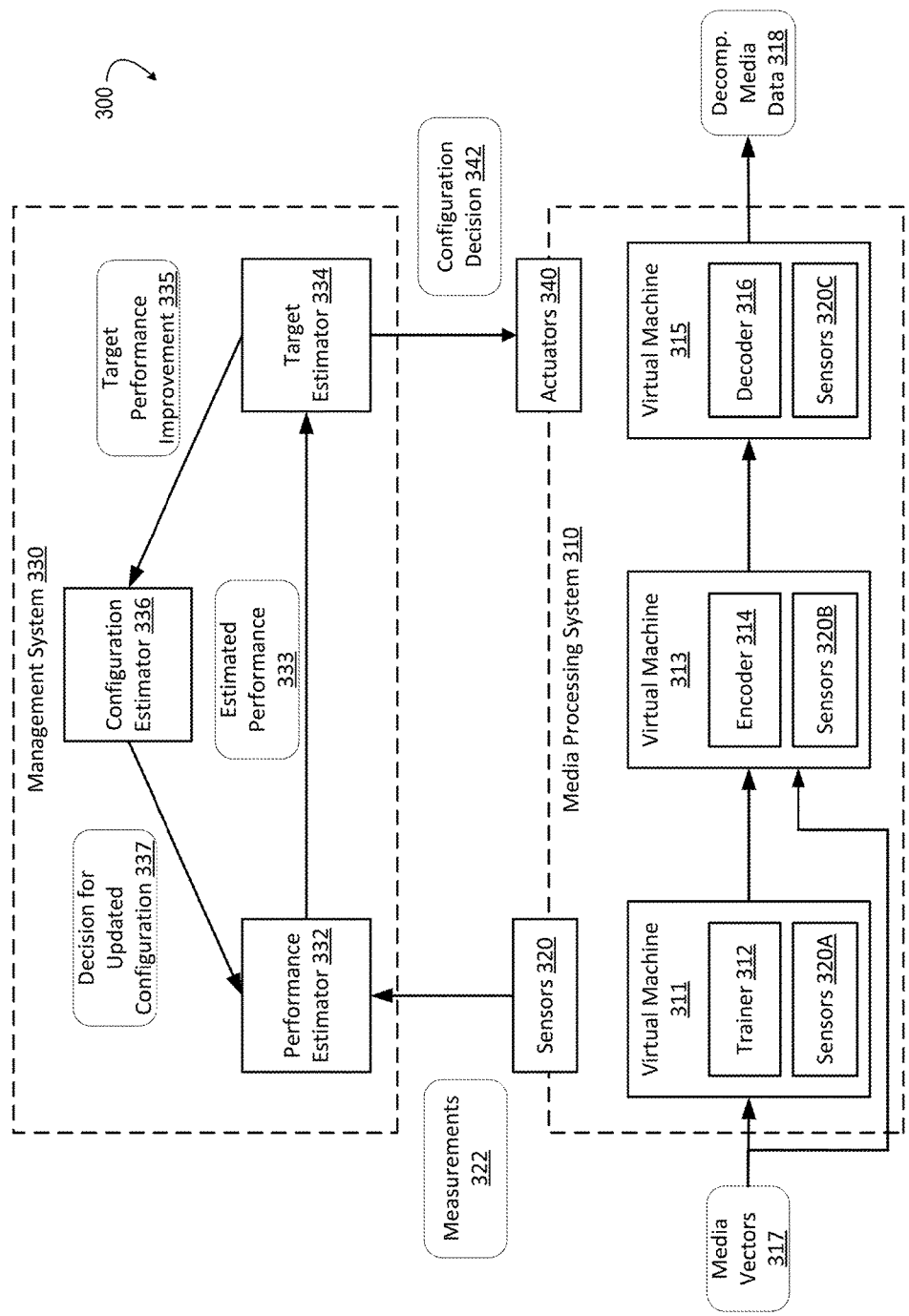
FIG. 3 is a diagram depicting an example of a computer system that implements autonomic computing to self-manage a media processing system according to certain embodiments.

FIG. 3 is a diagram depicting an example of a computer system 300 that implements autonomic computing to self-manage a media processing system 310 according to certain embodiments. As illustrated, the computer system 300 includes the media processing system 310 and a management system 330. Generally, the media processing system 310 includes various computing resources to perform a codec process on media data. Performing the codec process is associated with a latency performance. In comparison, the management system 330 manages the computing resources of the media processing system 310 to optimize the latency performance. The description of the media processing system 310 is presented herein next, followed by the description of the management system 330.

In some embodiments, the media processing system 310 uses vector quantization for the codec process. Accordingly, media vectors 317 are input to the media processing system 310. Decompressed media 318 are output from the media processing system 310. The codec process generates and stores compressed media data from the media vectors 317 and decompresses the compressed media data to output the decompressed media data 318.

In some embodiments, a media vector is a vector that includes elements, where the values of the elements correspond to values of media data. For example, a video stream is composed of video frames. Each video frame includes a set of pixels. Such a video frame can be represented with a set of video vectors. Each video vector captures a subset of the pixels. If the set of video vectors captures the values of all of the pixels, the vector representation of the video frame is lossless. However, vector quantization typically does not capture all the values and thus, the resulting vector representation is lossy. Video vectors generated from MPEG-4 video data are an example of a lossy vector representation.

In some embodiments, the media processing system 310 implements a trainer 312, an encoder 314, and a decoder 316 to support the codec process. The trainer 312 accesses the media vectors 317 and generates a codebook based on these vectors 317. In an example, the codebook is generated by iterative clustering of the media vectors 317 into clusters. An example of a suitable clustering algorithm includes K-means clustering. The codebook includes codebook vectors that correspond to the centroids. Further, the codebook includes indices of the codebook vectors. The iterative clustering to generate codebook results in a latency performance of the trainer 312.

In an illustrative embodiment, the trainer 312 is implemented as a module hosted on one or more virtual machines 311. The module stores computer-readable instructions that are executable on the virtual machine(s) 311. Upon execution, the virtual machine(s) 311 provides the functionalities of the trainer 312. The latency performance of the trainer 312 depends on many factors. Examples of these factors include the number of virtual machine(s) 311, the underlying computing resources of the data center hosting the virtual machine(s) 311, and the number of media channels from which the media vectors 317 are available.

In some embodiments, the codebook and the media vectors 317 are input to the encoder 314. In turn the encoder 314 compresses the media vectors 317 to achieve a compression ratio by representing such media vectors with some or all of the codebook vectors from the codebook and storing the indices of the representative codebook vectors in a data storage location. Generally, a media vector is represented with a codebook vector by searching for the best match in the codebook. Accordingly, the representative codebook vector is the vector from the codebook that best matches the media vector. The storage location can be a virtual storage location dedicated to a user account associated with a request to access the media vectors 317.

In an illustrative embodiment, the encoder 314 is implemented as a module hosted on one or more virtual machines 313. The module stores computer-readable instructions that are executable on the virtual machine(s) 313. Upon execution, the virtual machine(s) 313 provides the functionalities of the encoder 314. The latency performance of the encoder 314 depends on many factors. Examples of these factors include the number of virtual machine(s) 313, the underlying computing resources of the data center hosting the virtual machine(s) 313, the number and size of the media vectors 317, the size of the codebook, the compression ratio, and the number and timing of user requests to encode the media vectors 317.

In some embodiments, the codebook and the representative codebook indices are input to the decoder 316. The decoder 316 uses these indices to identify the relevant codebook vectors from the codebook and outputs the relevant codebook vectors. In lossy vector compression, the decompressed media data 318 includes these codebook vectors. In lossless vector compression, additional processing is performed to account for the differences between the codebook vectors and the media vectors 317. In this case, the decompressed media data 318 includes the media vectors 317.

In an example, the additional processing for lossless compression is distributed between the encoder 314 and the decoder 316 such that error information is passed from the encoder 314 to the decoder 316. The error information allows the decoder 316 to correct the differences between the codebook vectors and the media vectors 317. In an example, when the encoder 314 associates a media vector with a codebook vector, the encoder computes the difference between the two vectors. This difference can be computed as an error vector. Information about that error vector, such as a compression of the error vector, is passed with the index of the codebook vector to the decoder 316. In turn, the decoder 316 uses the information to compute the error vector and the index to identify the codebook vector, and corrects the identified codebook vector based on the error vector to output the media vector.

In an illustrative embodiment, the decoder 316 is implemented as a module hosted on one or more virtual machines 315. The module stores computer-readable instructions that are executable on the virtual machine(s) 315. Upon execution, the virtual machine(s) 315 provides the functionalities of the decoder 316. The latency performance of the decoder 316 depends on many factors. Examples of these factors include the number of virtual machine(s) 315, the underlying computing resources of the data center hosting the virtual machine(s) 315, the number and size of the codebook indices, the size of the codebook, the use of lossy or lossless compression, and the number and timing of user requests to decode the media vectors 317.

In some embodiments, the media processing system 310 further includes sensors 320. These sensors 320 may be implemented as specialized hardware and/or modules hosted on hardware or on one or more virtual machines. Generally, the sensors 320 measure various metrics related to the latencies of the trainer 312, the encoder 314, and the decoder 316.

In an illustrative embodiment, the factors that impact the latencies of the trainer 312, the encoder 314, and the decoder 316 are different. Accordingly, a different sensor is associated with each of these modules such that the individual latencies are properly measured. For instance, the virtual machine(s) 311 hosts a sensor 320A specifically configured to measure the latency of the trainer 312. Similarly, the virtual machine(s) 313 hosts a sensor 320B specifically configured to measure the latency of the encoder 314. And the virtual machine(s) 315 hosts a sensor 320C specifically configured to measure the latency of the decoder 316. The sensors 320A, 320B, and 320C form the sensors 322.

Generally, the trainer 312 processes jobs associated with generating the codebook. These jobs are internal to the media processing system 310 and do not depend on user requests from external user devices. Because these jobs are internal, they are typically more stable (e.g., their number and nature fluctuate less or are constant) than those of the encoder 314 and decoder 316. Accordingly, to measure the latency of the trainer 312, the sensor 320A implements a closed network queuing network model M/M/C that models the flow (e.g., throughput) of the jobs in-and-out of the trainer 312, where the number of jobs is relatively stable. This model can use the Erlang-C model to estimate the average response time that represents the latency of the trainer 312.

In comparison, the encoder 314 processes jobs associated with compressing media data and, in response to user requests, storing the compressed media data. These jobs are defined based on parameters external to the media processing system 310 (e.g., the number and timing of the requests, the requested media data, etc.). Because these jobs are externally defined, they are typically less stable (e.g., their number and nature fluctuate more) than those of the trainer 312. Accordingly, to measure the latency of the encoder 314, the sensor 320B implements an open network queuing network model M/M/C that models the distribution of the jobs in-and-out of the encoder 314, where the number of jobs varies over time. This model can use also the Erlang-C model to estimate the average response time that represents the latency of the encoder 314.

Another factor that the sensor 320B may monitor includes the compression ratio. The compression ratio depends on the number of media channels for which the codebook is generated and the desired number of codebook vectors in the codebook. The sensor 320B uses a regression model to estimate this ratio based on historical information about the number of media channels and the codebook.

Relative to the trainer 312 and the encoder 314, the decoder 316 typically has a smaller latency. Nonetheless, the jobs processed by the decoder 316 are also externally defined based on, for example, the number of user requests from external user devices for decompression of compressed media data. To measure the latency of the decoder 316, the sensor 320C also implements an open network queuing network model M/M/C.

Other factors that the sensors 322 may also monitor are environment-related factors. These factors include networks such as processing loads (e.g., central processing unit (CPU) usage), memory usage, hardware failures, network failures, network changes, performance degradation of the shared cloud environment.

The data measured by the sensors 322, including those of sensors 320A, 320B, and 320C are sent from the media processing system 310 to the management system 330 as measurements 322. In response, the management system 330 outputs a configuration decision 342 to the media processing system 310. The configuration decision 342 instructs the media processing system 310 to adjust, as needed, its computing resources. For example, the configuration decision 342 identifies additional virtual machines that should be launched and the configuration of these virtual machines (including whether each should host code for the trainer 312, encoder 314, and/or decoder 316). In another example, the configuration decision 342 identifies existing virtual machines (e.g., any of virtual machines 311, 313, or 315) that should be terminated.

In some embodiments, the media processing system 310 further includes actuators 340. The actuators 340 respond to the configuration decision 342 to adjust the computing resources of the media processing system 310. For example, the actuators represent a control plane within the data center or the computing cloud. The control plane launches and terminates virtual machines according to the configuration decision 342.

Turning to the details of the management system 330, this system 330 hosts a performance estimator 332, a target estimator 334, and a configuration estimator 336. Each of these components can be implemented on specialized hardware or as a module hosted on hardware or on one or more virtual machines. Generally, the management system 330 uses these modules to, in response to the measurements 322, estimate a current latency performance given a current configuration of the media processing system 310, a potential next latency performance, a difference between the potential next latency performance and a target performance, identify an adjustment to the current configuration, and generate and output the configuration decision 342. These functionalities of the management system 330 are described herein next.

In some embodiments, the performance estimator 332 implements a performance model to estimate the current latency performance and predict the next latency performance. In an example, a latency performance (whether current or next) is determined for the overall media processing system 310 based on the measurements 322. In this example, the performance model uses heuristic analysis or statistical analysis (e.g., regression processes) to determine the current latency based on historical measurements, the measurements 322, and the current configuration. For instance, the performance model also uses a state machine to predict the next latency performance using the measurements 322, and the current configuration. The state machine can be set-up based on the historical measurements. An example of the state machine is further described in connection with FIG. 4. In another illustration, the performance model uses a queuing network model and current workload information to estimate the next latency performance. Also in this example, the configuration decision 342 defines an adjustment to any of the computing resources of the media processing system 310, including the various virtual machines, such that its overall latency performance is improved.

In another example, an individual latency performance (whether current or next) is determined for each of the trainer 312, encoder 314, and decoder 316. In this example, each of the current latency performances can be an output from the sensors 320A, 320B, and 320C or can be estimated using the heuristic analysis and/or statistical analysis. The individual next latency performances can also be predicted by using the performance model (that, in turn, implements a state machine or a queuing network model). The input to the performance model is filtered to use the relevant data from the measurements 322. For instance, to predict the next latency performance of the trainer 312, measured data from the sensor 320A is used. Similarly, to predict the next latency performance of the encoder 314 or decoder 316, measured data from the sensor 320B or 320C, respectively, is used. In this example, the configuration decision 342 defines adjustments specific to each of the trainer 312, the encoder 314, and the decoder 316. For instance, if the next latency performance of the trainer 312 is predicted, the configuration decision 342 adjusts the configuration of the virtual machine(s) 311. Similarly, if the next latency performance of the encoder 314 or decoder 316 is predicted, the configuration decision 342 adjusts the configuration of the virtual machine(s) 313 or the virtual machine(s) 315, respectively.

Accordingly, the performance estimator 332 outputs an estimated latency performance 333 (overall to the system 310 or individual to the various codec modules) to the target estimator 334. In turn, the target estimator 334 outputs a target performance improvement 335. This improvement 335 represents a difference between the estimated latency performance and a target latency performance.

In some embodiments, the target estimator 334 maintains a list of target performances. These target performances can be defined for the overall media processing system 310 or individually to the various codec modules (e.g., the trainer 312, the encoder 314, and the decoder 316). The definitions can include lower and upper bounds on acceptable performances. In an example, the list of target performances includes a look-up table and is maintained based on SLAs associated with using the media processing system 310. Typically, the target estimator 334 accesses the list and identifies the relevant target performance, compares the estimated performance 333 received from the performance estimator 332 to the target performance, and outputs the target performance improvement 335 as the difference between the two. The configuration estimator 336 receives the target performance improvement 335 and, in response, outputs a decision for an updated configuration 337.

In some embodiments, the configuration estimator 336 implements a search model to generate the decision for the updated configuration 337. This decision defines the adjustments to the computing resources of the media processing system 310 and is output from the management system 330 as the configuration decision 342. Various search models are possible. For example, a state machine can be used, where the state machine identifies the various configurations that are possible and identifies, for each of these configurations, the likelihood to achieve the target performance improvements 335. The state machine can be defined based on historical information about the various configurations and the associated latency performances. An example of this state machine is further described in connection with FIG. 5. Another search model includes an optimization search that uses an objective function. The variables of the objective function represent the various possible configurations. The penalty cost of the objective function is set based on the deviation between the resulting latency performance of each of these possible configurations relative to the target performance improvement 335. The objective of the objective function is to find the next possible configuration that has the smallest penalty cost. Yet another search model uses a combinational search. In this case, the combination search iterates between varying the next possible configuration and estimating the resulting performance impact (improvement or detriment), until the target performance is approached as close as possible.

In addition, the configuration estimator 336 can maintain a list that associates latencies with computing resource configurations. For example, an association between a latency and a particular type of a virtual machine or a particular underlying computing resource that hosts the virtual machine indicates that launching the virtual machine requires a time period equal to at least the latency. This list can be maintained based on SLAs associated with using the data center and/or based on historical information about adjusting configurations of the computing resources (e.g., about launching new virtual machines). The configuration estimator 336 uses the list in the search for the next possible configuration in order to output the decision for the updated configuration 337. For example, the latency associated with each next configuration from the list is used as an additional latency for that configuration in the search, where this additional latency impacts how the associated next configuration meets the target performance improvement 335.

Hence, the computer system 300 implements a controller-based autonomic feedback loop. A global controller involves the estimator 332, the target estimator 334, and the configuration estimator 336 to iteratively receive measurement data, generate a configuration decision, and output this decision at predefined time intervals to local controllers. In each iteration, a local controller to the media processing system 310 is invoked for each codec module to measure and report the workload characteristics of that codec module, including its latency performance, to the global controller. Based on the reported workload characteristics, the global controller updates the parameters of the estimators 332, 334, and 336 to find the most optimal next configuration and reports this configuration back to the local controllers. This iterative update and reporting process is repeated at a rate corresponding to the predefined time intervals such that the optimal configuration of the media processing system 310 is continuously and proactively deployed.

Figure 4:
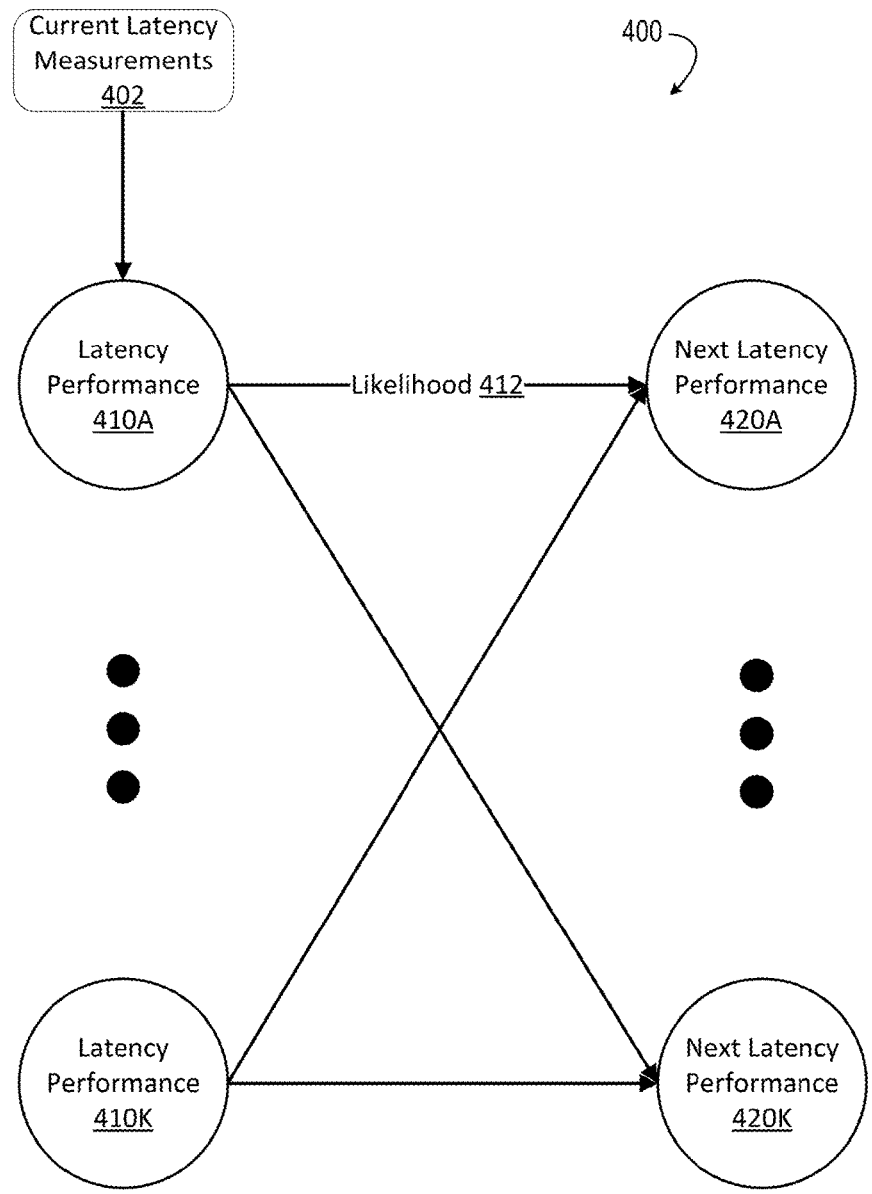
FIG. 4 illustrates an example of a state machine to predict a latency performance according to certain embodiments.

FIG. 4 illustrates an example of a state machine 400 to predict a latency performance according to certain embodiments. A performance estimator, such as the performance estimator 332 of FIG. 3, can use the state machine 400 to estimate various latency performances and their likelihoods for a given configuration of a media processing system (or of a codec module).

In some embodiments, a state represents a latency performance. A transition that connects a current state to a next state represents a likelihood of moving from the current state to the next state. The state machine 400 can be generated for a particular configuration of the media processing system based on historical data about the various observed latency performances for the particular configuration. For example, the states can be set as discrete ranges of the observed latency performances. Each transition can be set as an estimated likelihood of moving to the next associated latency performances given how the historical performances change with historical changes to latency-related factors (e.g., the number of jobs or user requests, environmental-related factors, etc.).

As illustrated, current latency measurements 402 are input to the state machine 400. The current latency measurements 402 include an estimation of the current latency performance. A current state is selected from the current states based on the estimation. The current states correspond to the possible current latency performances 410A-410K. The selected current state corresponds to the estimated current latency performance.

Various transitions are possible from the selected current state, each of which represents a transition likelihood 412 to one of the next latency performances 420A-420K. The next state having the highest transition likelihood is selected as the next latency performance. The transition thereto represents the likelihood of moving from the current estimated latency performance to the next latency performance.

Figure 5:
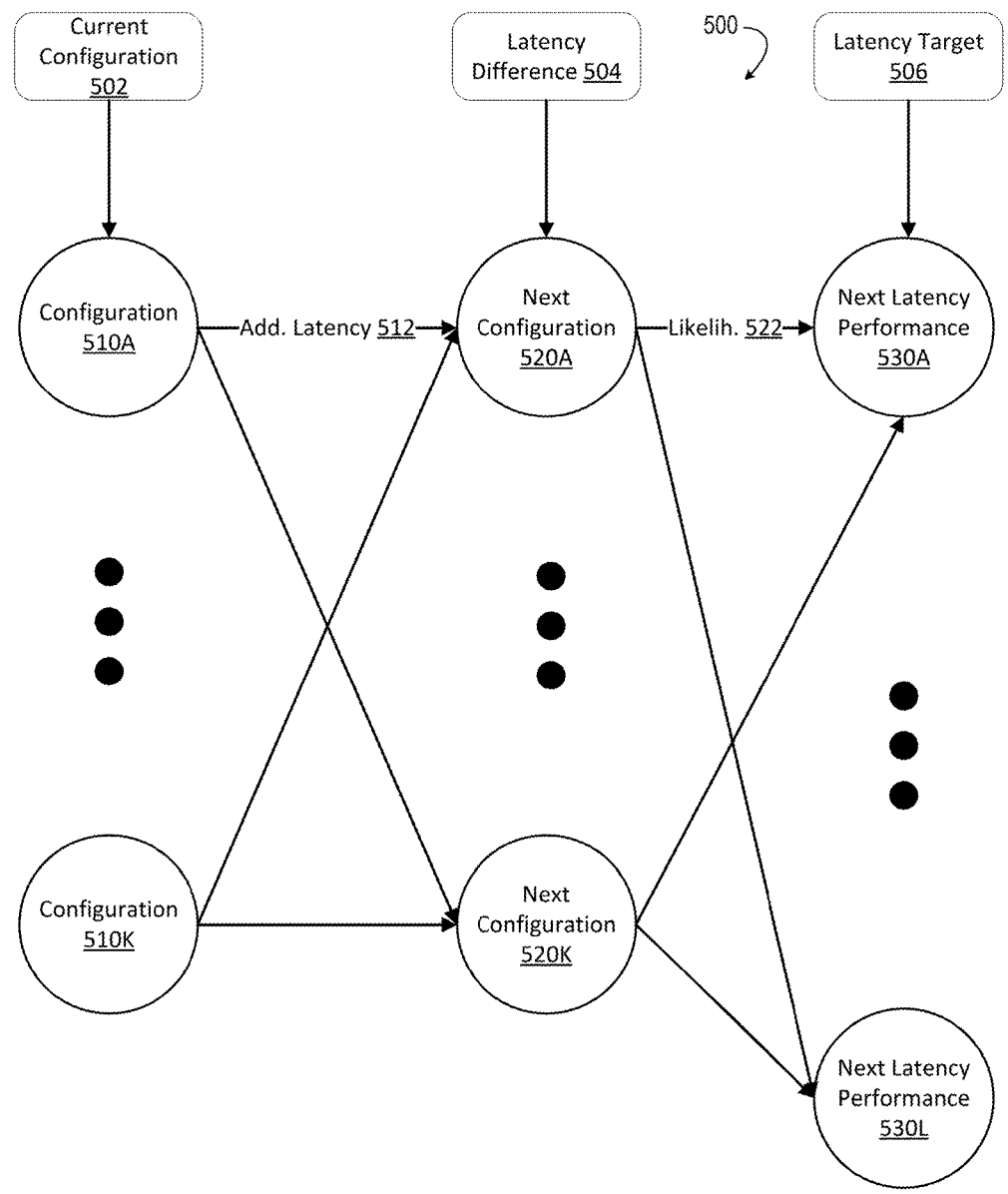
FIG. 5 illustrates an example of a state machine to identify a next configuration of computing resources according to certain embodiments.

FIG. 5 illustrates an example of a state machine 500 to identify a next configuration of computing resources according to certain embodiments. A configuration estimator, such as the configuration estimator 336 of FIG. 3, can use the state machine 500 to identify the next configuration from various possible configurations, compare the next configuration with the current configuration and generate a decision to adjust a current configuration based on any differences between the two configurations. FIG. 5 illustrates a multi-dimensional state machine, where one dimension corresponds to computing resource configurations and another dimension corresponds to latency performances. This state machine 500 can be generated based on historical data about the various observed latency performances given the various computing resource configurations and, hence, is common to all potential configurations. Multiple single-dimensional state machines can also be used, where each state machine is similar to the one described in connection with FIG. 4 and corresponds to a specific computing resource configuration.

As illustrated, one dimension of the state machine 500 includes states that correspond to computing resource configurations. A transition that connects a current state to a next state in this dimension identifies an additional latency to move from the corresponding current configuration to the corresponding next configuration. Another dimension of the state machine includes information about latency performances. In this dimension, for each next state, the possible next latency performances are set as next pseudo-states. A pseudo-transition between a next state and a next pseudo-state represents a likelihood of the next latency performance (represented by the next pseudo-state) given the next configuration (represented by the next state).

As illustrated, information about a current configuration 502 is input to the state machine 500. The information identifies the current configuration 502. Accordingly, a current state is selected from the current states based on this information. The current states correspond to the possible current configurations 510A-510K. The selected current state corresponds to the identified current configuration 502.

Thereafter, the next possible configurations 520A-520K are identified from the next states of the state machine 500. Each transition from the selected current state to one of the next states includes an additional latency 512 for adjusting the current configuration (represented by the selected current state) to the next configuration (represented by the connected next state).

In turn, a latency difference 504 is input to each of the next states. This latency difference 504 represents a target performance improvement (e.g., a difference between a current latency and a target latency 506). For each next state, the latency difference 504 and the additional latency for the transition into that next state are added to create a total latency. This total latency is set as the current latency performance for that next state. For each of the next states, pseudo-transitions to the next pseudo-states (that represent the possible next performances 530A-530L) are identified. Each pseudo-transition from a next state (representing a next configuration) to a pseudo-state (representing a next possible performance) identifies the likelihood of achieving the next possible performance given the next configuration and the total latency set for the next state.

The search for the next configuration propagates back from the pseudo-states to the next states. More specifically, the next latency performances 530A-530L are compared to the latency target 506. The next latency performance that is closest to the target latency 506 is selected. The pseudo-state associated with that next latency performance is identified. The various transitions into that pseudo-state are analyzed to select the transition that has the highest likelihood. The next state connected to that transition is identified. This next state represents the selected next configuration for the underlying computing resources.

To illustrate, the configuration 510A is identified as the current state based on the information about the current configuration 502. The additional latency 512 to move from the configuration 510 to the next configuration 520A is identified and is added to the latency difference 504 to generate a total latency for next configuration 520A. That total latency is used to predict the likelihoods of the possible next performances of the next configuration 520A. This process is repeated in the forward direction across the various next configurations. Thereafter, the next latency performance 530A is selected because it is the closest to the target latency 506. The search then moves in the backward direction. The likelihood of achieving the selected next latency performance 530A is identified for each of the next configurations 520A-520K. Out of the likelihoods, the likelihood 522 corresponding to the next configuration 520A is identified as being the highest likelihood. Accordingly, the next configuration 520A is selected. And a decision to adjust to the next configuration 520A from the current configuration 510A is generated.

Figure 6:
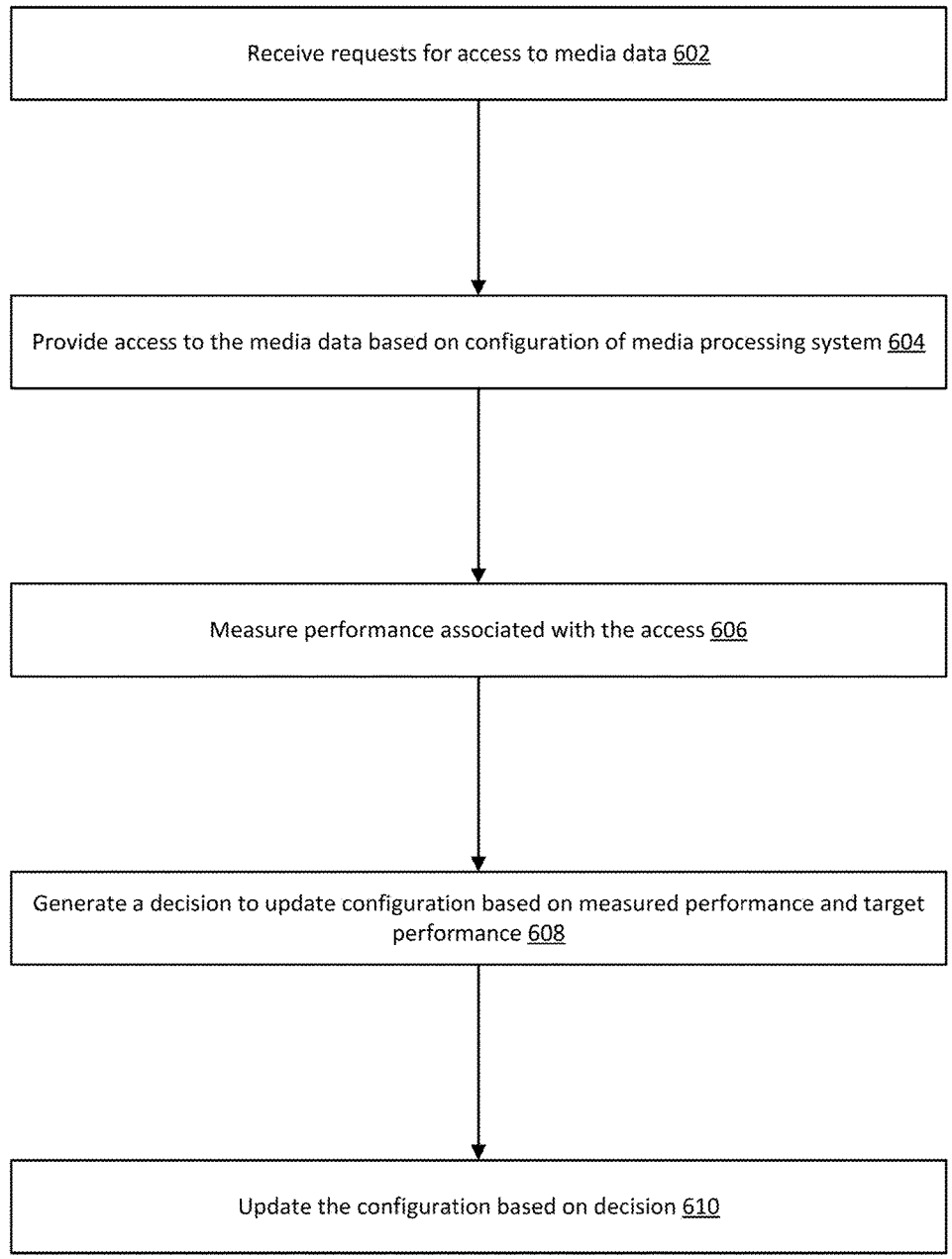
FIG. 6 illustrates an example of a flow for compressing and decompressing media data in a media processing system that is optimized for latency performance according to certain embodiments.
Figure 7:
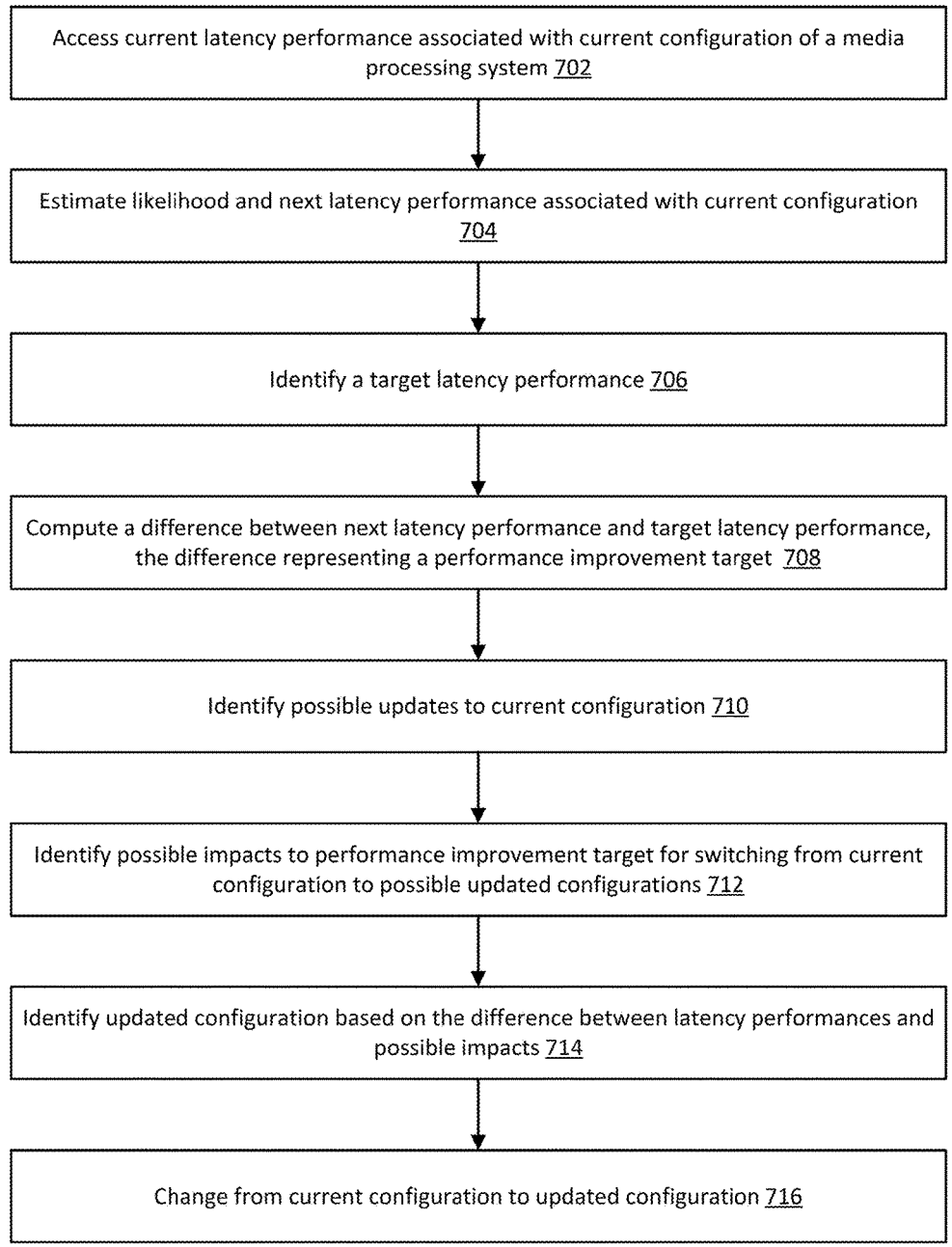
FIG. 7 illustrates an example of a flow for updating a configuration of a media processing system to optimize the latency performance according to certain embodiments.

FIGS. 6-7 illustrate examples of flows for optimizing the performance of a media processing system according to embodiments of the present disclosure. A computer system may be configured to perform the illustrative flows. For example, the computer system can be a component of the creative apparatus 118 of FIG. 1, can host the media processing system 220 of FIG. 2, or can host the media processing system 310 and the management system 330 of FIG. 3. Instructions for performing the operations of the illustrative flows can be stored as computer-readable instructions on a non-transitory computer-readable medium of the computer system. As stored, the instructions represent programmable modules that include code or data executable by a processor of the computer system. The execution of such instructions configures the computer system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered. Further, some of the operations between the two flows are similar. In the interest of clarity of explanation, the similarities are not repeated herein.

Furthermore, the flows are described in connection with optimizing a latency performance. The flows similarly apply to optimizing other performance types. For example, the SLA of the computer system (or the media processing system) defines a set of performance factors and targets for these factors. A first performance factor includes latency, a second performance factor includes CPU usage, and so on and so forth. Measurements related to these performance factors are collected and used to estimate the relevant performance (e.g., an estimated latency performance, an estimated CPU usage performance, etc.). One or more of the estimated performances are compared to the corresponding the target performance(s) (e.g., the estimated latency performance and the estimated CPU usage performance are compared to the target latency performance and the target CPU usage performance, respectively). Alternatively, a total performance score is computed from the estimated performances and compared to a target performance score. In both cases (whether the performances are individually or collectively compared), an updated computing configuration is determined and launched, such that the target performance(s) can be achieved as close as possible.

FIG. 6 illustrates an example of a flow for compressing and decompressing media data in a media processing system that is optimized for latency performance according to certain embodiments. The flow starts at operation 602, where the computer system receives requests for access to media data. In an example, the media data is available from a media processing system. Each request is received from a user device over a network. Generally, a request identifies a particular set of media data (e.g., video data for a particular television show), is associated with a user account, and invokes a particular operation on the set of media data (e.g., encode and store compressed video data, decompress and transmit compressed video data, etc.).

At operation 604, the computer system provides access to the media data based on a configuration of the media processing system. In an example, the media processing system receives each request and performs a relevant codec process to the requested media data. Compressed media data can be stored for each associated user request. The media processing system also decompresses the compressed media data as part of the codec process. The computer system manages access for each user device to the compressed and/or decompressed media data based on user authentication, transmits the user requests to the media processing system, and transmits media data (generally the decompressed media data) to the user devices.

At operation 606, the computer system measures a performance of the media processing system associated with the access to the media data. In an example, the performance includes a latency performance. The computer system measures individual latencies and other-latency related factors associated with various codec modules of the media processing system. These measurements are used to estimate an overall performance of the media processing system based on historical latency performances.

At operation 608, the computer system generates a decision to update the configuration of the media processing system based on the measured performance and a target performance. For example, the computer system predicts a next latency performance given the current configuration. The computer system also identifies the target latency performance from a list and compares the predicted next latency performance to the target latency performance to identify a target performance improvement. The computer system uses the target performance improvement and, optionally, additional latencies associated with transitioning to other configurations, to search for and identify the next configuration of the media processing system that would most likely approach or achieve the target performance improvement. The current configuration and the next configuration are compared to identify needed adjustments. The generated decision describes these adjustments.

At operation 610, the computer system updates the configuration of the media processing system based on the decision. For example, the computer system deploys additional computing resources or removes existing computing resources to move from the current configuration to the next configuration.

FIG. 7 illustrates an example of a more detailed flow for updating the configuration of the media processing system to optimize the latency performance according to certain embodiments. Generally, updating the configuration includes determining an updated configuration of the media processing system based on its current configuration and updating the current configuration to the updated configuration. For instance, additional number of virtual resources may be launched, where this number and the configuration of the virtual resources are specified in the updated configuration.

The example flow starts at operation 702, where the computer system accesses a current latency performance associated with a current configuration of the media processing system. In an example, sensors local to the media processing system measure individual latency performances of the codec modules and other latency-related factors. At predefined time intervals, the measurements are passed to a performance predictor of a management system of the computer system. The performance predictor estimates an overall latency performance of the media processing system based on a heuristic analysis or a statistical analysis of the measurements and historical latency performances associated with the current configuration.

At operation 704, the computer system estimates a next latency performance of the media processing system and a likelihood of the next latency performance based on the current latency performance and on historical latency performances associated with the current configuration. For example, the computer system uses a state machine, such as the state machine 400 of FIG. 4, to identify the next possible latency performances and the likelihoods of transitioning from the current latency performance to each of these performances. The state machine can be generated for the current configuration based on the historical latency performances. The next latency performance is estimated by identifying the next possible latency performance that has the highest transition likelihood and setting this next possible latency performance as the next latency performance. The likelihood of the next latency performance is estimated as the highest transition likelihood. In another example, the computer system uses a queuing network model and current workload information to estimate the most likely next latency performance. The queuing network model can vary depending on the whether the latency performance is measured for a trainer, an encoder, or a decoder. For the trainer, a closed network queuing network model M/M/C is used and models the flow (e.g., throughput) of the jobs in-and-out of the trainer. For each of the encoder and the decoder, an open network queuing network model M/M/C is used and models the distribution of the jobs in-and-out of the encoder and the decoder, respectively. The current workload information includes the current jobs that are input to and the current jobs that are output from the queuing network model.

At operation 706, the computer system identifies a target latency performance. For example, a target estimator identifies the target latency performance from a list that maintains such targets.

At operation 708, the computer system computes a difference between the next latency performance and the target latency performance. The difference represents a target improvement latency.

At operation 710, the computer system identifies possible updates to the current configuration. Each possible update corresponds to a next potential configuration of the media processing system. The next potential configurations represent all possible configurations of the underlying computing resources that can host the codec modules, such as virtual machines that can be used for the hosting. In an example, a configuration estimator of the computer system maintains a list of such possible configurations. The list can be maintained based on SLAs associated with using the underlying computing resources.

At operation 712, the computer system identifies possible impacts to the target performance improvement. Each impact is associated with switching from the current configuration to a next potential configuration and represents an additional latency for performing the switch. In an example, the configuration estimator identifies the impacts from a list that associates additional latencies with the next potential configurations. The list can be maintained based on the SLAs associated with using the underlying computing resources and/or on historical data about the observed additional latencies. For example, the list identifies that to launch an additional virtual machine suitable for hosting a trainer of the codec process, a one second latency should be added to the latency performance, whereas to launch an additional virtual machine suitable for hosting an encoder of the codec process, a two second latency should be added.

At operation 714, the computer system identifies an updated configuration of the media processing system. In an example, the updated configuration is identified based on the difference between the next latency performance and the target latency performance (e.g., the target performance improvement) and based on historical performances associated with the next potential configurations. In a further example, the updated configuration is identified also based on the possible latency impacts. For example the latency impact to a next potential configuration is added to the difference and used in identification of the updated configuration. Various techniques are possible for the identification. One example technique uses a search that involves a state machine, as illustrated in connection with FIG. 5. In particular, the next latency performances are estimated for each potential configuration and compared to the target performance improvement. The next potential configuration that most likely approaches or achieves the target performance improvement is selected. The current configuration is then compared to the potential configuration to determine any necessary adjustments. Such adjustments over the current configuration represent the updated configuration. In another example technique, an objective function is used. Its variables are set as the next potential configurations. The penalty cost of the objective function is set based on the deviation between the resulting next latency performance and the target performance improvement. The objective of the objective function is to find the potential configuration that has the smallest penalty cost.

In yet another example technique, a combinational search is used and iterates between varying the next possible configuration and estimating the resulting latency performance impact (improvement or detriment). For a simple illustration, the current configuration includes four instances of a trainer and six instances of an encoder. The estimated latency is 200 ms and the target latency in the SLA is less than 100 ms. The combination search can increase the number of instances hosting the trainer and/or encoder or can migrate the current instances to more powerful servers. At the same time, increasing the number or performing the migration cannot be performed without a limit because, otherwise, too much cost can be incurred for using the additional instances or more powerful servers. To find a near optimal solution (minimize the cost while meeting the target latency performance) in a reasonable amount of time, the combinational search manipulates the various relevant tuning parameters (number of instances, type of servers, changes to the trainer and/or encoder parameters, etc.) to get a new configuration and use the queueing network model to estimate the resulting next latency performance. Based on this estimated next latency performance, the combinational search decides what to tuning parameter to further refine. After some iterations, we a local optima can be achieved (e.g., the target latency performance is approached as much as possible) and is set as the updated configuration.

At operation 716, the computer system changes the configuration of the media processing system from the current configuration to the updated configuration. For example, the computer system deploys or removes the necessary computing resources that host the various codec modules. In an illustrative example, the updated configuration specifies an additional number of virtual machines associated with hosting the codec. The computer system launches this additional number of virtual machines. In another illustrative example, the updated configuration specifies an existing number of virtual machines should be reduced by a total number. The computer system terminates this total number of virtual machines.

Figure 8:
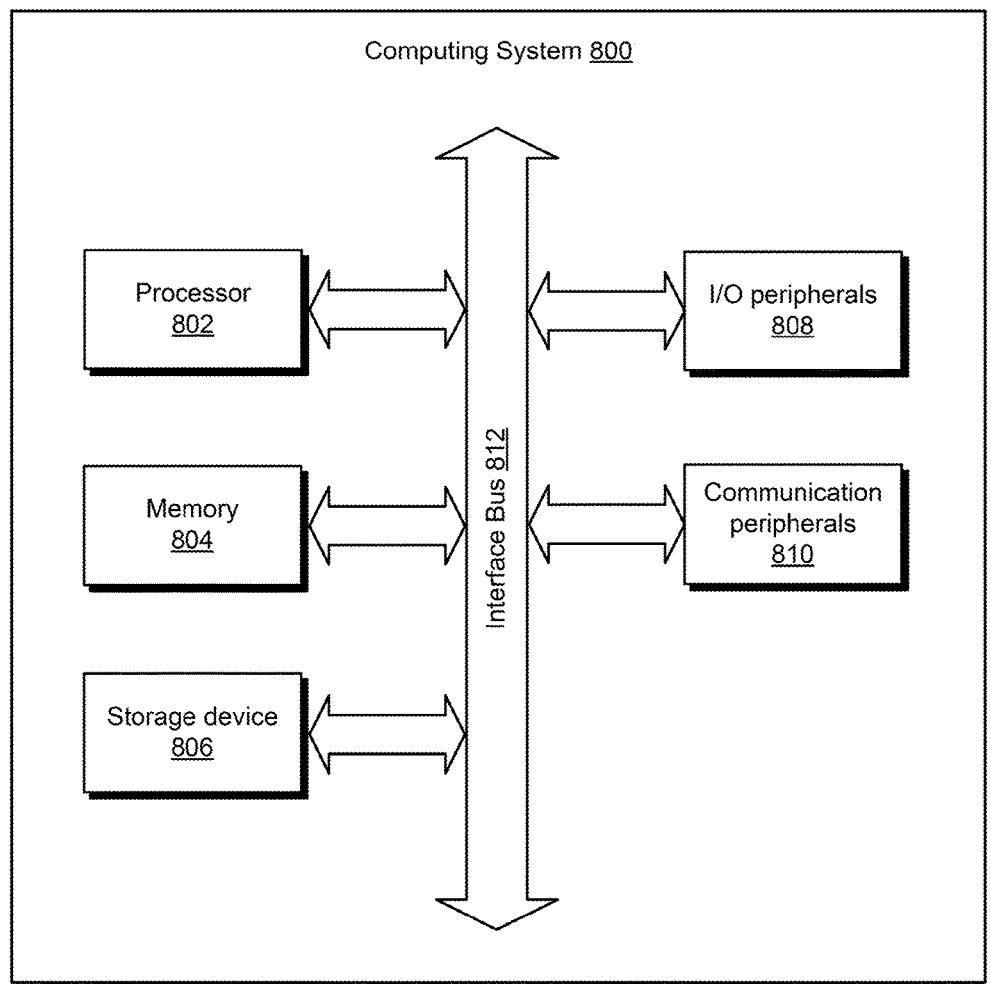
FIG. 8 illustrates examples of components of a computer system according to certain embodiments.

FIG. 8 illustrates examples of components of a computer system 800 according to certain embodiments. The computer system 800 is an example of the computers systems described in connection with FIGS. 1-7. Although these components are illustrated as belonging to a same computer system 800, the computer system 800 can also be distributed.

The computer system 800 includes at least a processor 802, a memory 804, a storage device 806, input/output peripherals (I/O) 808, communication peripherals 810, and an interface bus 812. The interface bus 812 is configured to communicate, transmit, and transfer data, controls, and commands among the various components of the computer system 800. The memory 804 and the storage device 806 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 804 and the storage device 806 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 800.

Further, the memory 804 includes an operating system, programs, and applications. The processor 802 is configured to execute the stored instructions and includes, for example, a logical processing unit, a microprocessor, a digital signal processor, and other processors. The memory 804 and/or the processor 802 can be virtualized and can be hosted within another computing system of, for example, a cloud network or a data center. The I/O peripherals 808 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 808 are connected to the processor 802 through any of the ports coupled to the interface bus 812. The communication peripherals 810 are configured to facilitate communication between the computer system 800 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms, such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements, and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for dynamically reconfiguring a media processing system to improve system performance by reducing latency, the computer-implemented method comprising:
   collecting, by a computer system and using one or more sensors, measurements associated with the media processing system by using a queuing network model that models one or more flows of one or more jobs in and out of the media processing system;
   estimating, by the computer system, a current latency performance associated with the media processing system based on a heuristic analysis or a statistical analysis of the measurements and a current configuration of the media processing system;
   predicting, by a performance estimator executing the computer system, a next latency performance of the media processing system by applying a state machine to historical measurements, the current latency performance, and the current configuration of the media processing system;
   identifying, by the computer system, an adjustment to the current configuration of the media processing system by estimating a difference between the next latency performance and a target latency performance; and
   updating, by the computer system, the current configuration of the media processing system by applying the adjustment to the current configuration.

2. The computer-implemented method of claim 1, wherein the state machine comprises states associated with latency performances and comprises transitions between the states, wherein a current state is associated with the current latency performance, wherein a next state is associated with the next latency performance, and a transition between the current state and the next state identifies a likelihood of transitioning between the current latency performance to the next latency performance.

3. The computer-implemented method of claim 1, wherein the media processing system hosts a codec process, wherein the current latency performance is associated with a training module that generates a codebook, wherein the codebook facilitates encoding and decoding of media vectors by the codec process, wherein the queuing network model is a closed queuing network model of virtual machines that host the training module, and wherein the closed queuing network model has a constant number of jobs of the training module.

4. The computer-implemented method of claim 1, wherein the media processing system hosts a codec process, wherein the current latency performance is associated with at least one of an encoder of the codec process or a decoder of the codec process, wherein the queuing network model is an open network queuing model of virtual machines, wherein the open queuing network model hosts at least one of the encoder or the decoder and has a variable number of user requests for encoding and decoding media vectors.

5. The computer-implemented method of claim 1, wherein the target latency performance is identified from a look-up table that stores a latency associated with launching an additional virtual machine, and wherein the adjustment is identified based on the latency associated with launching the additional virtual machine.

6. The computer-implemented method of claim 1, wherein the target latency performance is defined as a first performance factor in a service level agreement of the media processing system, wherein the service level agreement defines a second performance factor, and where the adjustment is further identified based on the second performance factor.

7. The computer-implemented method of claim 1, wherein identifying the adjustment comprises using a combinational search that iteratively updates a next configuration based on an estimation of estimations of the next latency performance.

8. The computer-implemented method of claim 1, wherein identifying the adjustment an additional state machine that identifies, for a next configuration, states and transitions to the states, wherein each state corresponds to a next latency performance, and wherein a transition to a state identifies a likelihood of transitioning from the current latency performance to a next latency performance based on the next configuration.

9. The computer-implemented method of claim 1, wherein the current configuration comprises a number of virtual machines that host a codec process, wherein the adjustment comprises an additional number of virtual machines, the method further comprising:
   accessing, by the computer system, an updated latency performance measured in response to a hosting of a codec process on the additional number of virtual machines;
   predicting, by the computer system and based on the adjustment and on historical latency performances associated with the adjustment, an updated next latency performance;
   determining, by the computer system, that an existing number of virtual machines should be reduced by a total number based on the updated next latency performance; and
   terminating, by the computing system, the total number of virtual machines.

10. A system comprising:
    means for collecting, by a computer system and using one or more sensors, measurements associated with a media processing system by using a queuing network model that models one or more flows of one or more jobs in and out of the media processing system;
    means for estimating a current latency performance associated with a current configuration of a media processing system based on a heuristic analysis or a statistical analysis of the measurements and a current configuration of the media processing system;
    means for predicting a next latency performance of the media processing system by applying a state machine to historical measurements, the current latency performance and the current configuration;
    means for identifying an adjustment to the current configuration of the media processing system by estimating a difference between the next latency performance and a target latency performance; and
    means for updating the current configuration of the media processing system by applying the adjustment to the current configuration.

11. The system of claim 10, wherein the current configuration comprises a number of virtual machines that host a codec process, wherein the adjustment comprises an additional number of virtual machines, wherein the virtual machines of the current configuration host (i) a trainer that generates a codebook, (ii) an encoder that encodes media vectors based on the codebook, and (ii) a decoder that decodes the encoded media vectors based on the codebook, and wherein the adjustment further comprises a subset of the additional number of virtual machines for each of the trainer, encoder, and decoder.

12. The system of claim 10, wherein virtual machines of the current configuration host (i) a trainer that generates a codebook, (ii) an encoder that encodes media vectors based on the codebook, and (iii) a decoder that decodes the encoded media vectors based on the codebook, and wherein the current latency performance corresponds to an overall latency of generating the codebook, encoding media vectors, and decoding the encoded media vectors.

13. The system of claim 10, wherein virtual machines of the current configuration host (i) a trainer that generates a codebook, (ii) an encoder that encodes media vectors based on the codebook, and (iii) a decoder that decodes the encoded media vectors based on the codebook, wherein the current latency performance corresponds to a latency of generating the codebook, wherein a next configuration further associates an additional number of virtual machines with the trainer, and wherein updating the current configuration comprises launching the additional number of virtual machines and host the trainer on the additional number of virtual machines.

14. The system of claim 10, wherein virtual machines of the current configuration host a trainer that (i) generates a codebook, (ii) an encoder that encodes media vectors based on the codebook, and (iii) a decoder that decodes the encoded media vectors based on the codebook, wherein the current latency performance corresponds to a latency of encoding the media vectors, wherein a next configuration further associates additional number of virtual machines with the encoder, and wherein updating the current configuration comprises launching the additional number of virtual machines and hosting the encoder on the additional number of virtual machines.

15. A non-transitory computer-readable storage medium comprising computer-readable instructions that, upon execution on a computer system cause the computer system to perform operations comprising:

collecting, by a computer system and using one or more sensors, measurements associated with a media processing system by using a queuing network model that models one or more flows of one or more jobs in and out of the media processing system;

estimating a current latency performance associated with the media processing system based on a heuristic analysis or a statistical analysis of the measurements and a current configuration of the media processing system;

predicting a next latency performance of the media processing system by applying a state machine to historical measurements, the current latency performance and the current configuration of the media processing system;

identifying an adjustment to the current configuration of the media processing system by estimating a difference between the next latency performance and a target latency performance; and updating the current configuration of the media processing system by applying the adjustment to the current configuration.

16. The non-transitory computer-readable storage medium of claim 15, wherein the state machine comprises states and transitions between the states, wherein a current state is associated with the current latency performance, and wherein a next state is associated with the next latency performance.

17. The non-transitory computer-readable storage medium of claim 15, wherein identifying a next configuration comprises using an additional state machine generated based on historical latency performances associated with one or more potential configurations.

18. The non-transitory computer-readable storage medium of claim 17, wherein the additional state machine identifies, for the next configuration, states and transitions to the states, wherein each state corresponds to a next latency performance, and wherein a transition to a state identifies a likelihood of transitioning from the current latency performance to a next latency performance based on the next configuration.

* * * * *